May 5, 1931.  J. H. HAND  1,803,430
CLUTCH MECHANISM
Filed Feb. 6, 1928  2 Sheets-Sheet 1

INVENTOR.
Jesse H. Hand
BY
Parker & Burton
ATTORNEYS.

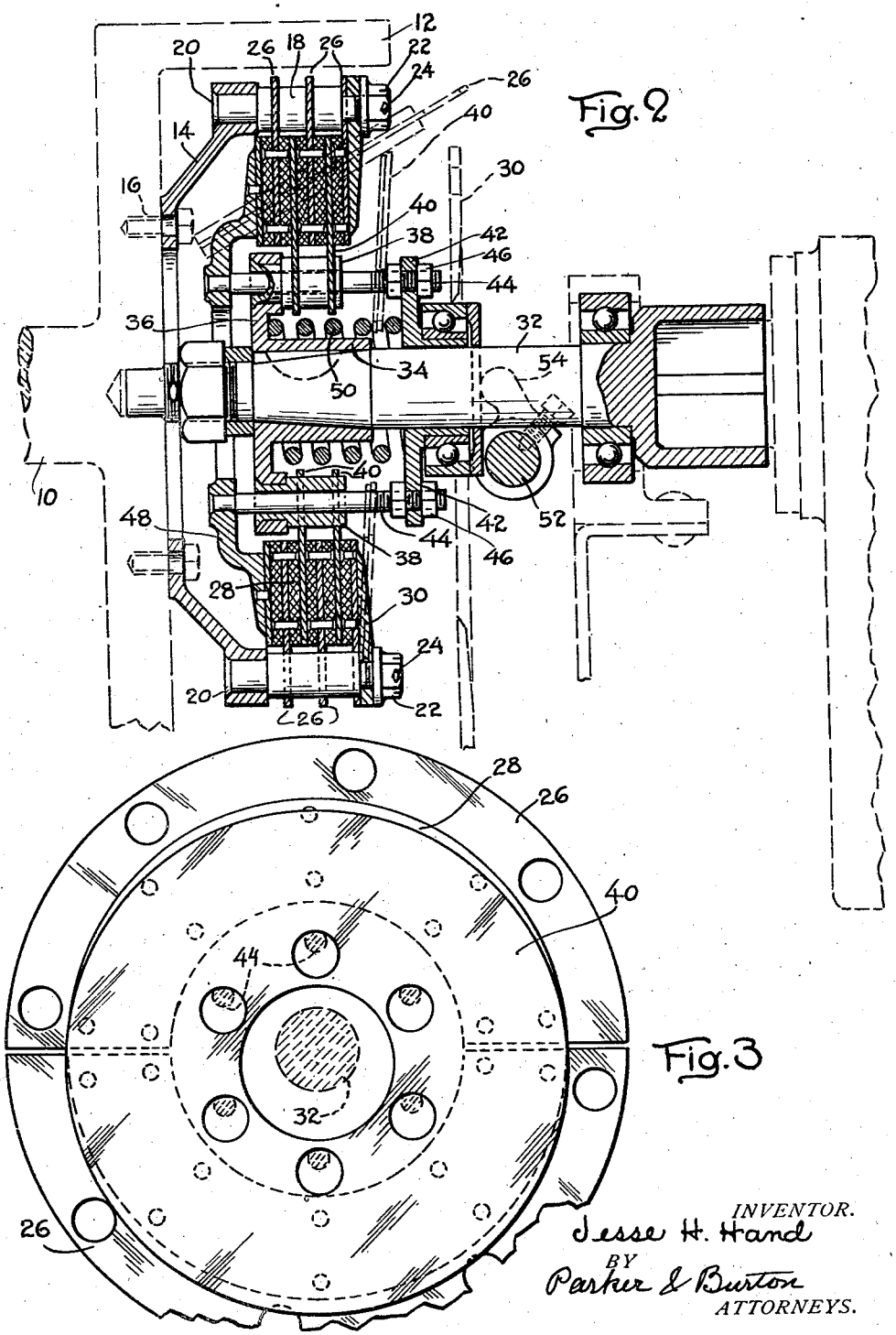

Patented May 5, 1931

1,803,430

UNITED STATES PATENT OFFICE

JESSE H. HAND, OF DETROIT, MICHIGAN

CLUTCH MECHANISM

Application filed February 6, 1928. Serial No. 252,139.

My invention relates to improved clutch mechanism and particularly to mechanism of this class adapted for use in a motor vehicle to connect the power plant with the change speed gearing to drive the vehicle.

An object is to provide strong, sturdy clutch mechanism capable of performing the purpose for which it is intended which is of such a character that it may be readily disassembled to remove worn parts, and new parts may be easily and quickly installed therein.

A meritorious feature lies in the provision of a clutch of this type having interleaved driving and driven plates, one series of which is divided into segments individually detachable and removable. The second series of plates comprise members which are shiftable to a tilted position to facilitate the removal of the segmental plate sections.

An advantage of my improved structure lies in the provision, in a multiple plate clutch, having a driving plate carrier and a driven plate carrier, one carrier being disposed within the other, of a multiplicity of clutch plates mounted upon the respective carriers and so constructed that the plates carried by the outer carrier are readily removable in sections and the plates carried by the inner carrier are shiftable to an oblique position to facilitate such removal.

Other objects, advantages and meritorious features of my invention will more fully appear from the following description, appended claims and accompanying drawings, wherein:

Fig. 2 is a vertical sectional view therethrough.

Fig. 3 is a rear elevation showing a clutch in partial disassembly.

Figure 1:
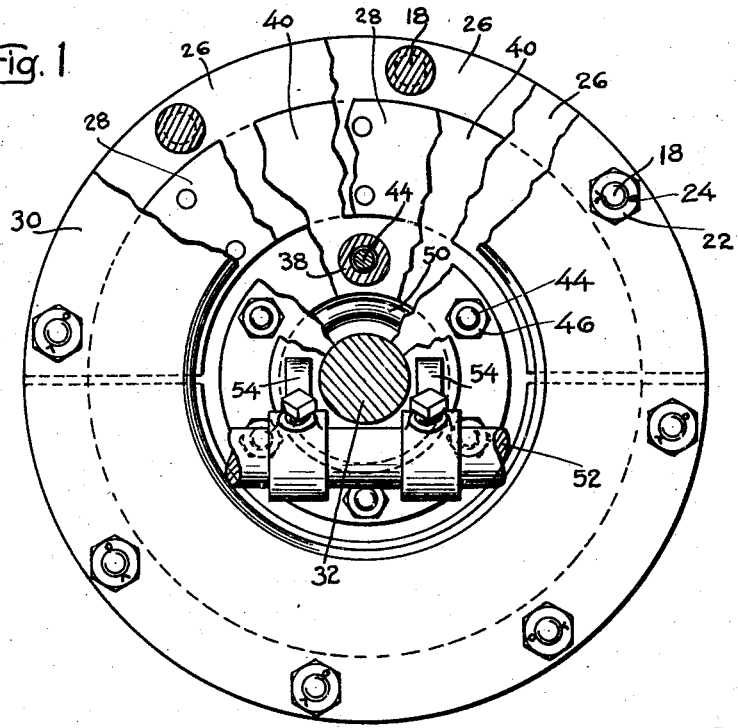
Fig. 1 is a rear elevation of my clutch structure.

My improved clutch structure is shown as employed to couple the aligned driving and driven shafts of a motor vehicle together for rotation. The drive shaft 10 is provided with a fly wheel 12 within which a clutch plate carrier 14 is suitably secured as by means of screws 16. This carrier is provided with a plurality of plate supporting studs 18 riveted at 20 to the carrier and provided at their outer ends with nuts 22 which may be locked against rotation by cotter pins 24.

Figure 4:
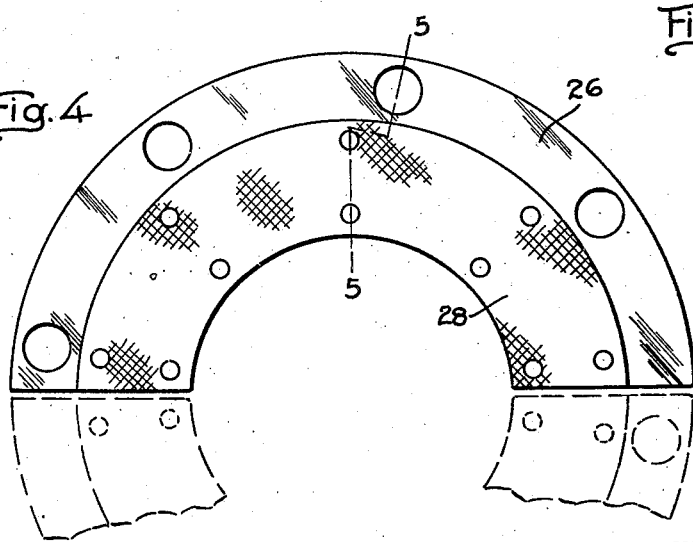
Fig. 4 is a fragmentary elevation of one of the divided clutch plates.
Figure 5:
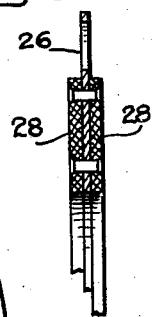
Fig. 5 is a sectional view taken on line 5—5 of Fig. 4.

A series of clutch plates 26 are supported upon the studs. These clutch plates are provided, as shown in Fig. 5, with linings or facings 28, on both sides and are slidably supported upon the studs and are distinguished by being divided into two segments each comprising substantially one-half of the clutch disc, all as shown in Fig. 4 and other figures of the drawing.

A thrust plate 30 of disc form is supported upon the studs 18 and held in place by the nuts 22.

The driven shaft may be indicated as 32 and is arranged end to end with respect to the driving shaft. A clutch plate carrier or annular hub member 34 is keyed upon the driven shaft 32 as indicated in Fig. 2 of the drawing and this carrier has a flange 36 supporting a series of clutch plate supporting studs 38 upon which are mounted metal disc clutch plates 40.

A thrust bearing 42 carries a series of connecting bolts 44 secured thereto by nuts 46 at one end and which support at the opposite end a thrust plate 48. These bolts extend slidably through the stud members 38 carried by the hub. A spring 50 is interposed between the thrust bearing and the hub to exert a pressure tending to hold the thrust plate 48 to compress the clutch discs 26 and 40 together against the thrust plate 30.

The clutch is released in the usual fashion through torque applied to a shaft 52 to oscillate bearing members 54 to force the thrust bearing inwardly against the clutch spring.

The operation of the clutch is generally similar to that of multiple plate clutches as heretofore known to the trade but in my improved clutch certain of the clutch plates, such as the plates which carry the wearable clutch facings, are divided into segments.

The thrust plate 30 may, upon removal of the nuts 22, be moved to the position shown in dotted outline in Fig. 2. The outer upper segmental clutch plate may then be readily removed. The shaft is then rotated and the lower segmental clutch plate is removed. The outer clutch disc 40 may then be shifted to the position shown in dotted outline in Fig. 2. In this position it has been dropped downwardly and disposed diagonally so as to provide a clearance through which the adjacent segmental clutch plate may be removed. In this manner it is possible to readily disassemble those wearing portions of the clutch which may be replaced during use and to quickly assemble the same upon completion of the repair job. It will be seen that the combined clutch plates of the two carriers are axially apertured to permit the shaft 32 to extend therethrough.

I claim:—

1. Clutch mechanism comprising, in combination with a pair of shafts arranged end to end, a pair of clutch plate carriers one mounted upon each shaft to rotate therewith, clutch plates carried by each carrier, thrust plates holding said clutch plates together, one carrier being mounted within the other and provided with tubular parts upon which its clutch plates are supported, operating connections extending through said tubular parts and connected with one thrust plate to be actuated slidably through said parts to release the clutch.

2. Clutch mechanism comprising a shaft, a hub carried thereby, tubular parts supported upon the hub extending parallel to the axis of the shaft, pins extending slidably through said tubular parts, a thrust plate carried by said pins at one end thereof, a thrust bearing engaging said pins at their opposite end, an operating member engaging said thrust bearing to actuate it to move said thrust plate, and a spring interposed between said hub and thrust bearing.

3. Clutch mechanism comprising, in combination, driving plates and driven plates, a carrier for each set of plates one carrier provided with tubular parts upon which its plates are slidably supported, operating connections extending slidably through said tubular parts, a thrust plate carried by said operating connections at one end of said parts, a thrust bearing engaging said operating connections at the opposite end of said parts, a rock member engaging said thrust bearing to actuate said thrust bearing and a spring exerting a tension tending to hold said thrust plate against the clutch plates.

4. Clutch mechanism comprising, in combination, a pair of clutch plate carriers arranged one within the other, the inner carrier provided with a plurality of plate supporting tubular parts, clutch plates slidably supported upon said parts, the outer carrier provided with a plurality of plate supporting parts, clutch plates slidably supported upon said parts interleaved alternately with the plates of the other carrier, means operable to urge said plates into close engagement with each other including operating connections extending operatively through the tubular parts of the inner carrier.

5. Clutch mechanism comprising, in combination, a pair of clutch plate carriers, one arranged within the other and each provided with plate supporting studs, the studs of the inner carrier being tubular, clutch plates supported upon the studs of each carrier, the plates of one carrier being arranged alternately with respect to the plates of the other carrier, tensioning connections extending operatively through said tubular studs and means actuated thereby tending to urge the plates in a given direction, the plates supported upon the tubular studs being slidable thereover to a tilted position upon the tension connections extending therethrough.

6. Clutch mechanism comprising, in combination, a pair of clutch plate carriers, a clutch plate mounted upon each carrier, one of said carriers provided with tubular parts upon which its clutch plate is supported to rotate with the carrier, the clutch plate mounted upon one carrier being formed in segments, a pair of thrust plates arranged on opposite sides of said combination of clutch plates and operating connections extending through the tubular parts of one of the clutch plate carriers and secured to one of said thrust plates and operable to actuate said thrust plate to release the clutch plates.

In testimony whereof, I, JESSE H. HAND, sign this specification.

JESSE H. HAND.